US012757252B2

(12) United States Patent
Henttonen et al.

(10) Patent No.: US 12,757,252 B2
(45) Date of Patent: Oct. 6, 2026

(54) EFFICIENT SIGNALLING OF FEATURES COMBINATION FOR RANDOM ACCESS CHANNEL PARTITIONING

(71) Applicant: Nokia Technologies Oy, Espoo (FI)

(72) Inventors: Tero Henttonen, Espoo (FI); Daniela Laselva, Klarup (DK); Malgorzata Tomala, Wroclaw (PL); Chunli Wu, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 758 days.

(21) Appl. No.: 17/898,091

(22) Filed: Aug. 29, 2022

(65) Prior Publication Data

US 2023/0127137 A1 Apr. 27, 2023

(30) Foreign Application Priority Data

Oct. 22, 2021 (WO) ................ PCT/CN2021/125775

(51) Int. Cl.
*H04W 74/0833* (2024.01)
*H04W 74/00* (2009.01)
*H04W 74/0836* (2024.01)
*H04W 74/0838* (2024.01)

(52) U.S. Cl.
CPC ..... *H04W 74/0833* (2013.01); *H04W 74/002* (2013.01); *H04W 74/0836* (2024.01); *H04W 74/0838* (2024.01)

(58) Field of Classification Search
None
See application file for complete search history.

(56) References Cited

U.S. PATENT DOCUMENTS 11,089,613 B2 * 8/2021 Ryu ...................... H04L 1/1671
11,856,614 B2 * 12/2023 Deenoo ................. H04W 76/28
2020/0245362 A1 7/2020 Höglund et al.
(Continued)

FOREIGN PATENT DOCUMENTS

CN 110784934 A 2/2020
CN 111919491 A 11/2020
(Continued)

OTHER PUBLICATIONS

Extended European Patent Search Report dated Feb. 10, 2023, corresponding to European Patent Application No. 22194121.4.
(Continued)

*Primary Examiner* — Gerald A Smarth
(74) *Attorney, Agent, or Firm* — SQUIRE PATTON BOGGS (US) LLP

(57) ABSTRACT

Systems, methods, apparatuses, and computer program products for efficiently signalling feature combinations for RACH partitioning. One method may include a network entity transmitting a radio resources configuration associated with at least one feature combination configuration and associated random access resources configuration. The at least one feature combination configuration is associated with at least one of coverage enhancement, network slicing, reduced capability user equipment, or small data transmission. The associated random access resources configuration is associated with access conditions for the at least one feature combination configuration.

16 Claims, 6 Drawing Sheets

(56) References Cited

U.S. PATENT DOCUMENTS

| | | | | |
|---|---|---|---|---|
| 2021/0058971 | A1 | 2/2021 | MolavianJazi et al. | |
| 2021/0144517 | A1* | 5/2021 | Guim Bernat | H04L 41/0843 |
| 2023/0292372 | A1* | 9/2023 | Kang | H04W 48/12 |

FOREIGN PATENT DOCUMENTS

| | | | | | |
|---|---|---|---|---|---|
| CN | 113455090 | A | | 9/2021 | |
| WO | 2018/063063 | A1 | | 4/2018 | |
| WO | 2019/158099 | A1 | | 8/2019 | |
| WO | 2020/024831 | A1 | | 2/2020 | |
| WO | 2021/181001 | A1 | | 9/2021 | |
| WO | WO-2021219723 | A1 | * | 11/2021 | H04W 74/0833 |

OTHER PUBLICATIONS

Ericsson: "RACH partitioning for Rel-17 features", 3GPP Draft; R2-2110559, 3rd Generation Partnership Project (3GPP), Mobile Competence Centre ; 650, Route Des Lucioles ; F-06921 Sophia-Antipolis Cedex ; France vol. RAN WG2; Oct. 21, 2021.

Qualcomm Incorporated: "Unified approach to RACH partitioning and indication", 3GPP Draft; R2-2107219, 3rd Generation Partnership Project (3GPP), Mobile Competence Centre ; 650, Route Des Lucioles ; F-06921 Sophia-Antipolis Cedex ; France vol. RAN WG2; Aug. 6, 2021.

"3rd Generation Partnership Project; Technical Specification Group Radio Access Network; NR; Radio Resource Control (RRC) protocol specification (Release 16)", 3GPP TS 38.331, V16.6.0, Sep. 2021, pp. 1-961.

"3rd Generation Partnership Project; Technical Specification Group Radio Access Network; NR; NR and NG-RAN Overall Description; Stage 2 (Release 16)", 3GPP TS 38.300, V16.7.0, Sep. 2021, pp. 1-152.

"3rd Generation Partnership Project; Technical Specification Group Radio Access Network; NR; Physical channels and modulation (Release 16)", 3GPP TS 38.211, V16.7.0, Sep. 2021, pp. 1-134.

"RACH partitioning for Rel-17 features", 3GPP TSG-RAN WG2 #114e, R2-2104933, Agenda: 8.18, Ericsson, May 19-27, 2021, pp. 1-6.

"RACH indication and partitioning", 3GPP TSG RAN WG2 #115-e, R2-2108210, Agenda: 8.18, Huawei, Aug. 9-27, 2021, pp. 1-10.

International Search Report and Written Opinion received for corresponding Patent Cooperation Treaty Application No. PCT/CN2021/125775, dated Jun. 23, 2022, 9 pages.

"Unified approach to RACH partitioning and indication", 3GPP TSG-RAN WG2 Meeting #115-e, R2-2107219, Agenda: 8.18, Qualcomm Incorporated, Aug. 16-27, 2021, pp. 1-5.

"Discussion on PRACH partitioning", 3GPP TSG-RAN WG2 #115, R2-2107256, Agenda: 8.18, OPPO, Aug. 2021, pp. 1-8.

European Communication pursuant to Article 94(3) EPC, corresponding to EP Application No. 22 194 121.4, dated Jan. 23, 2025.

European Communication under Rule 71(3) EPC, corresponding the EP Application No. 22 194 121.4, dated Jun. 17, 2025.

Chinese Office Action, with machine English translation, corresponding the CN Application No. 202211247296.8, dated Jul. 1, 2025.

Ericsson, "RACH partitioning for Rel-17 features", 3GPP TSG-RAN WG2 #116e, Electronic meeting, Nov. 11-12, 2021, R2-2110559, 8 pages.

European Communication under Rule 71(3) EPC, corresponding to EP Application No. 22 194 121.4, dated Sep. 8, 2025.

Argentinian Office Action corresponding to AR Application No. 20220102817, dated Oct. 23, 2025.

* cited by examiner

EFFICIENT SIGNALLING OF FEATURES COMBINATION FOR RANDOM ACCESS CHANNEL PARTITIONING

TECHNICAL FIELD

Some example embodiments may generally relate to mobile or wireless telecommunication systems, such as Long Term Evolution (LTE), fifth generation (5G) radio access technology (RAT), new radio (NR) access technology, and/or other communications systems. For example, certain example embodiments may relate to systems and/or methods for efficiently signalling feature combinations for random access channel (RACH) partitioning.

BACKGROUND

Examples of mobile or wireless telecommunication systems may include radio frequency (RF) 5G RAT, the Universal Mobile Telecommunications System (UMTS) Terrestrial Radio Access Network (UTRAN), LTE Evolved UTRAN (E-UTRAN), LTE-Advanced (LTE-A), LTE-A Pro, NR access technology, and/or MulteFire Alliance 5G wireless systems refer to the next generation (NG) of radio systems and network architecture. A 5G system is typically built on a 5G NR, but a 5G (or NG) network may also be built on E-UTRA radio. It is expected that NR can support service categories such as enhanced mobile broadband (eMBB), ultra-reliable low-latency-communication (URLLC), and massive machine-type communication (mMTC). NR is expected to deliver extreme broadband, ultra-robust, low-latency connectivity, and massive networking to support the Internet of Things (IoT). The next generation radio access network (NG-RAN) represents the RAN for 5G, which may provide radio access for NR, LTE, and LTE-A. It is noted that the nodes in 5G providing radio access functionality to a user equipment (e.g., similar to the Node B in UTRAN or the Evolved Node B (eNB) in LTE) may be referred to as next-generation Node B (gNB) when built on NR radio, and may be referred to as next-generation eNB (NG-eNB) when built on E-UTRA radio.

SUMMARY

In accordance with some example embodiments, a method may include transmitting, by a network entity, a radio resources configuration associated with at least one feature combination configuration and associated random access resources configuration. The at least one feature combination configuration is associated with at least one of coverage enhancement, network slicing, reduced capability user equipment, or small data transmission. The associated random access resources configuration is associated with access conditions for the at least one feature combination configuration.

In accordance with certain example embodiments, an apparatus may include means for transmitting a radio resources configuration associated with at least one feature combination configuration and associated random access resources configuration. The at least one feature combination configuration is associated with at least one of coverage enhancement, network slicing, reduced capability user equipment, or small data transmission. The associated random access resources configuration is associated with access conditions for the at least one feature combination configuration.

In accordance with various example embodiments, a non-transitory computer readable medium may be encoded with instructions that may, when executed in hardware, perform a method. The method may include transmitting a radio resources configuration associated with at least one feature combination configuration and associated random access resources configuration. The at least one feature combination configuration is associated with at least one of coverage enhancement, network slicing, reduced capability user equipment, or small data transmission. The associated random access resources configuration is associated with access conditions for the at least one feature combination configuration.

In accordance with some example embodiments, a computer program product may perform a method. The method may include transmitting a radio resources configuration associated with at least one feature combination configuration and associated random access resources configuration. The at least one feature combination configuration is associated with at least one of coverage enhancement, network slicing, reduced capability user equipment, or small data transmission. The associated random access resources configuration is associated with access conditions for the at least one feature combination configuration.

In accordance with certain example embodiments, an apparatus may include at least one processor and at least one memory including computer program code. The at least one memory and the computer program code may be configured to, with the at least one processor, cause the apparatus to at least transmit a radio resources configuration associated with at least one feature combination configuration and associated random access resources configuration. The at least one feature combination configuration is associated with at least one of coverage enhancement, network slicing, reduced capability user equipment, or small data transmission. The associated random access resources configuration is associated with access conditions for the at least one feature combination configuration.

In accordance with various example embodiments, an apparatus may include circuitry configured to transmit a radio resources configuration associated with at least one feature combination configuration and associated random access resources configuration. The at least one feature combination configuration is associated with at least one of coverage enhancement, network slicing, reduced capability user equipment, or small data transmission. The associated random access resources configuration is associated with access conditions for the at least one feature combination configuration.

In accordance with some example embodiments, a method may include receiving, by a user equipment, a radio resources configuration associated with at least one feature combination configuration and associated random access resources configuration. The at least one feature combination configuration is associated with at least one of coverage enhancement, network slicing, reduced capability user equipment, or small data transmission. The associated random access resources configuration is associated with access conditions for the at least one feature combination configuration.

In accordance with certain example embodiments, an apparatus may include means for receiving a radio resources configuration associated with at least one feature combination configuration and associated random access resources configuration. The at least one feature combination configuration is associated with at least one of coverage enhancement, network slicing, reduced capability user equipment, or small data transmission. The associated random access resources configuration is associated with access conditions for the at least one feature combination configuration.

In accordance with various example embodiments, a non-transitory computer readable medium may be encoded with instructions that may, when executed in hardware, perform a method. The method may include receiving a radio resources configuration associated with at least one feature combination configuration and associated random access resources configuration. The at least one feature combination configuration is associated with at least one of coverage enhancement, network slicing, reduced capability user equipment, or small data transmission. The associated random access resources configuration is associated with access conditions for the at least one feature combination configuration.

In accordance with some example embodiments, a computer program product may perform a method. The method may include receiving a radio resources configuration associated with at least one feature combination configuration and associated random access resources configuration. The at least one feature combination configuration is associated with at least one of coverage enhancement, network slicing, reduced capability user equipment, or small data transmission. The associated random access resources configuration is associated with access conditions for the at least one feature combination configuration.

In accordance with certain example embodiments, an apparatus may include at least one processor and at least one memory including computer program code. The at least one memory and the computer program code may be configured to, with the at least one processor, cause the apparatus to at least receive a radio resources configuration associated with at least one feature combination configuration and associated random access resources configuration. The at least one feature combination configuration is associated with at least one of coverage enhancement, network slicing, reduced capability user equipment, or small data transmission. The associated random access resources configuration is associated with access conditions for the at least one feature combination configuration.

In accordance with various example embodiments, an apparatus may include circuitry configured to receive a radio resources configuration associated with at least one feature combination configuration and associated random access resources configuration. The at least one feature combination configuration is associated with at least one of coverage enhancement, network slicing, reduced capability user equipment, or small data transmission. The associated random access resources configuration is associated with access conditions for the at least one feature combination configuration.

BRIEF DESCRIPTION OF THE DRAWINGS

For proper understanding of example embodiments, reference should be made to the accompanying drawings, wherein:

FIG. 1(*b*) illustrates an example of a 4-step RACH procedure.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for efficiently signalling feature combinations for RACH partitioning is not intended to limit the scope of certain example embodiments, but is instead representative of selected example embodiments.

RACH resources may define the time and frequency resources that may be used by user equipment (UE) for random access, and may include RACH occasions (ROs) in time and/or RACH preambles available in each RO. When a UE transmits a physical random access channel (PRACH) preamble, the UE may transmit according to a specific pattern or sequence, similar to a signature. Each NR cell may have 64 preamble sequences available for each RO. In contention-based random access (CBRA), once the UE determines a suitable RO, the UE may randomly select one of the valid preambles for transmission in the RO among the available ROs, as configured by the network.

Figure 1A:
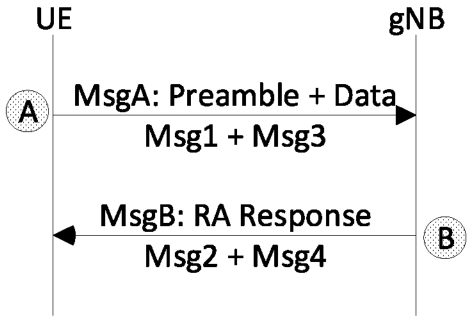
FIG. 1(*a*) illustrates an example of a 2-step RACH procedure.
Figure 1B:
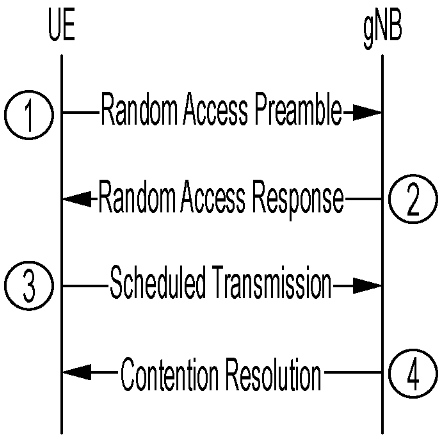

FIG. 1(*a*) illustrates an example of a 2-step RACH procedure for partitioning of RACH resources, as defined in 3GPP Release (Rel)-16. Similarly, FIG. 1(*b*) illustrates an example of a 4-step RACH procedure supported in 3GPP Rel-15. The partitioning in the 2-step RACH procedure may require partitioning the entire set of RACH resources into two pools, with each pool dedicated to the corresponding RACH procedure (i.e., 2-step or 4-step RACH).

In 3GPP Rel-16, the gNB may broadcast the two pools using a RACH-ConfigCommonTwoStepRA information element (IE), which may be further subdivided via a GroupB-ConfiguredTwoStepRA-r16 IE contained in the RACH-ConfigCommonTwoStepRA IE. The UE may then indicate whether it is using a 2-step or 4-step RACH procedure in message A (MsgA) for 2-step RACH procedure, or in an Msg1 for 4-step RACH, respectively, by selecting and transmitting a RACH resource from the corresponding pool of resources.

Contention-free radio access (CFRA) resources and CBRA resources may be further partitioned. For example, CFRA resources may be dedicated to a given UE (e.g., in RRC Connected mode with an assigned cell radio network temporary identifier (C-RNTI)), while the UE may need to contend for RACH resources in the contention-based pool. For CBRA partitioning, different UEs may select the same CBRA resource, and/or may interfere with other UEs, causing an undesirable RACH collision.

Currently, in order to enable the network to identify each feature based on the preamble/RO used by the UE, RACH resources may be further partitioned to support initial access of some 3GPP Rel-17 features, such as:

| Feature | RACH indication/reason for partitioning |
|---|---|
| CovEnh | To indicate the need for coverage enhancement (e.g., for request of Msg3 repetition) to the network |

-continued

| Feature | RACH indication/reason for partitioning |
| --- | --- |
| Slicing | To indicate the need for prioritization and isolation of a slice (including RACH isolation) to the network |
| RedCap | To indicate the reduced capabilities of the UE to the network so that the network can adapt subsequent transmissions (as compared to a regular UE) |
| SDT | To indicate the small data transmission (SDT) procedure, thus to request a larger Msg3 size or MSGA size (as compared to regular Msg3/MSGA size for non-SDT/legacy resume) |

The partitioning of RACH resources may be achieved either by partitioning the ROs for different features (i.e., different ROs may be dedicated to different features), or by partitioning the preambles associated with an RO for different features (i.e., different preambles of an RO may be dedicated to different features, as defined in 3GPP Rel-16 for 2-step and 4-step RACH partitioning). However, dedicating ROs per feature may introduce delays in the RA procedure since the UE requiring a feature may need to wait until a valid RO becomes available, with fewer valid ROs available per feature due to splitting of resources. In contrast, preambles in an RO dedicated per feature may be realized, for example, by using a RACH mask, and may allow all features to use any RO, resulting in a lower RA latency achieved for any service in the cell. However, this may limit the number of preambles available per feature. In turn, the probability of undesirable RACH collisions may increase, which may also indirectly increase latency times. The supported cell sizes may also be limited in this case since an increased cell size may require skipping cyclic shifts when creating the PRACH preamble sequences so that larger distances between the cyclic shifts of the PRACH root sequences may be obtained. The number of root sequences may be limited by cell planning and inherent mathematical properties of the sequences themselves. The problem of preamble limitation and collision may worsen with more features to be separated.

In order to configure RACH resources, each cell may need to be selected and use one out of 256 PRACH configurations, determining the RO periodicity and the ROs location in time. Prior to 3GPP Rel-16, RACH capacity and dimensioning has been possible due to the limited number of required RACH resources. For example, with 20 ms RO periodicity and 40 MHz carrier bandwidth, about 3% of the resources may be dedicated to RACH. In contrast, beginning with 3GPP Rel-17, separate RACH configurations may need to be available to support initial access for various 3GPP Rel-17 features, thereby increasing the number of resources used for RACH in the cell. As a result, in addition to legacy RACH resources, the network may need to allocate a sufficient number of RACH resources for each additional RACH configuration dedicated to 3GPP Rel-17 features. This may ensure that the tolerable collision probability and latency key performance indicators (KPIs) are within the allowed targets for each feature (e.g., <1% PRACH collision probability).

Certain example embodiments described herein may have various benefits and/or advantages to overcome the disadvantages described above. For example, certain example embodiments may provide a more efficient, leaner, and future-proof signalling of feature combinations for RA partitioning. Thus, certain example embodiments discussed below are directed to improvements in computer-related technology.

Figure 2:
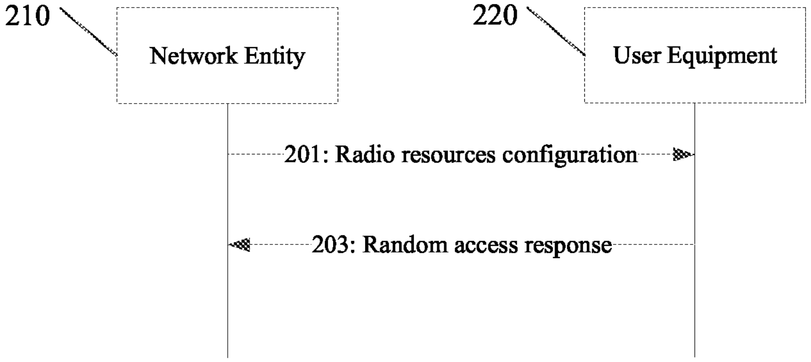
FIG. 2 illustrates an example of a signaling diagram according to certain example embodiments.
Figure 5:
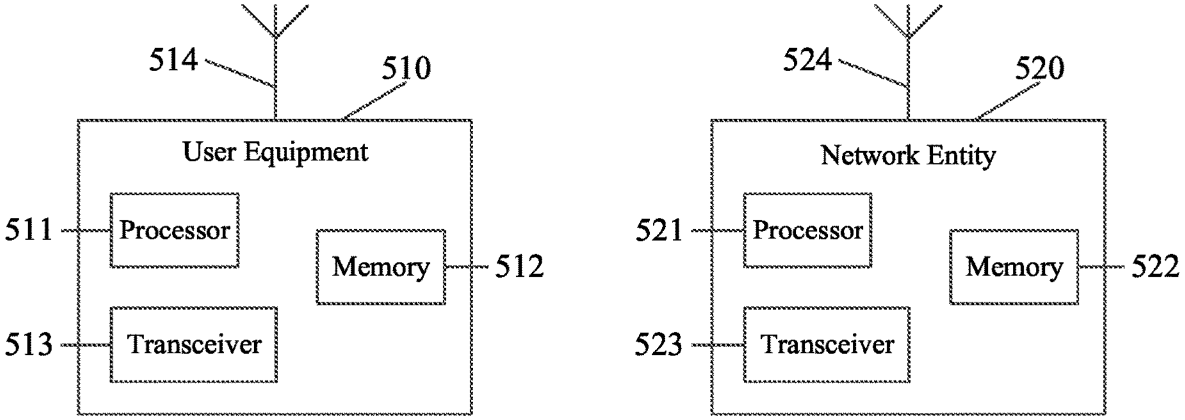
FIG. 5 illustrates an example of various network devices according to some example embodiments.

FIG. 2 illustrates a signaling diagram depicting an example of efficiently signalling feature combinations for RACH partitioning. NE 210 and UE 220 may be similar to NE 510 and UE 520, as illustrated in FIG. 5, according to certain example embodiments. At 201, NE 210 may transmit a radio resources configuration associated with at least one feature combination and associated random access resources configuration to UE 220, which may include signalling to indicate to UE 220 feature combinations and associated radio access resources split across the feature combinations applicable to a RACH configuration for NE 210 and UE 220. Some example embodiments may use a fixed number of explicitly reserved bits for signaling, wherein each RA purpose may be indicated by 1 bit, and K bits may be reserved for later changes. For example, each RA partition may be determined under RACHCommon configuration based on at least one intended feature or feature combination sets. For example, two Information Elements (e.g., bitmaps) may indicate the features or feature combination sets corresponding to the given RA partition. A first bitmap (i.e., denoted FeatureCombination) may indicate to the UE the applicable RA purposes/features (e.g., RedCap, Small Data, CovEnh, etc.) used by the given cell (max N bits, thus max N purposes/features), while a second bitmap (i.e., denoted FeatureCombinationIndicationBitmap) may indicate the actual combinations of RA features and prioritization (max M combinations, e.g., RedCap+Small Data combo) applicable for the UE out of features/purposes set in the first bitmap, such as follows:

```
FeatureCombination ::= SEQUENCE {
   redCap                 ENUMERATED {true}     OPTIONAL,
   smallData              ENUMERATED {true}     OPTIONAL,
   slicing                ENUMERATED {true}     OPTIONAL,
   covEnh                 ENUMERATED {true}     OPTIONAL,
   spare1                 ENUMERATED {true}     OPTIONAL,
   spare2                 ENUMERATED {true}     OPTIONAL,
   spare3                 ENUMERATED {true}     OPTIONAL,
   spare4                 ENUMERATED {true}     OPTIONAL
}
FeaturesCombinationIndicationBitmap ::= BIT STRING (SIZE (maxNrofFeatures))
maxNrofFeatures    ::=     INTEGER (2..8)
```

The two example encodings may indicate 4 purposes (e.g., redCap, smallData, slicing, and CovEnh), while 4 bits may be reserved to retain enough flexibility. FeaturesCombinationIndicationBitmap may comprise a bit for each feature set to “true” in the FeatureCombination, allowing any combination out of those features to be signalled.

In another example, a bit string may be used for the spare values in the FeatureCombination (similar to master information block (MIB)), such as below:

```
FeatureCombination : := SEQUENCE {
   redCap              ENUMERATED {true}      OPTIONAL,
   smallData           ENUMERATED {true}      OPTIONAL,
   slicing             ENUMERATED {true}      OPTIONAL,
   covEnh              ENUMERATED true}       OPTIONAL,
   spare               BIT STRING (SIZE(4))
}
```

As a result, the bit-cost in system information (SI) would be 3+(2-8)=5-11 bits added to the RA feature combination. The NE may only need to indicate the bitmap of feature combinations, and the abstract syntax notation (ASN).1 definition of the FeatureCombination indicates the remaining features.

Using the above embodiments, 3GPP Rel-17 may be configured as FeatureCombination (size 8): {RedCap: true; smallData: true; slicing: true; CovEnh: true; Reserved: false}, maxNrofFeatures=4 (4 features set to true). Alternatively, Feature CombinationIndicationBitmap (size 4) may be configured as:

| | RedCap | Small Data | Slicing | CovEnh |
|---|---|---|---|---|
| SDT + RedCap combo | 1 | 1 | 0 | 0 |
| Slicing + CovEnh + combo | 1 | 1 | 0 | 0 |

Using the above embodiments, 3GPP Rel-18 may configure the following: FeatureCombination (size 8): o {RedCap: true; smallData: true; slicing: true; CovEnh: true; Rel-18 Feature: true; Reserved: false}; maxNrofFeatures=5 (5 features set to true). Alternatively, FeatureCombinationIndicationBitmap (size 4) may be configured as:

| | RedCap | Small Data | Slicing | CovEnh | R18 Feature |
|---|---|---|---|---|---|
| SDT + RedCap combo | 1 | 1 | 0 | 0 | 0 |
| Slicing + CovEnh + combo | 1 | 1 | 0 | 0 | 0 |
| Slicing + CovEnh + R.18 | 1 | 1 | 0 | 0 | 1 |

In various example embodiments, slicing may be indicated implicitly or separately, and/or may be considered or partially in the RA partition. For example, each RA partition defined for the bitmaps in certain example embodiments may be used by the UE assigned to a specific slice group.

As an example, a more dynamic list of features may be populated, as shown below, thus allow for almost infinite extendibility as any number of additional RA features could be added at the cost of additional signalling, such as follows:

```
FeatureCombination ::= SEQUENCE (SIZE (1.. maxNrofFeatures)) OF
RA-Feature
RA-Feature :: CHOICE {
   redCap,
   smallData,
   slicing,
   covEnh,
   reserved1, for potential Rel-18+Feature
   reserved2, for potential Rel-18+Feature
   reserved3, for potential Rel-18+Feature
   reserved4, for potential Rel-18+Feature
}
FeaturesCombinationIndicationBitmap ::= BIT STRING (SIZE
(maxNrofFeatures))
maxNrofFeatures ::=      INTEGER (1..N) // e.g. N = 5
```

In this way, the bit-cost in SI would be (1−N)*3+N=N+3-4N bits (e.g., 8-20 bits in case N=5, similarly as with previous example the size depending on how many feature combinations are indicated).

In certain example embodiments, slicing may be indicated in a feature combination, with overriding or partial applicability in the RA partition. Specifically, each RA partition (and associated feature combination) may correspond to (i.e., be assigned to) one slice group, with slice group=1 corresponding to a non-slicing case (i.e., default slice). For example, slice group 2 may correspond to feature combination 1 (e.g., SDT+RedCap), while slice group 3 may correspond to feature combination 2 (e.g., SDT+covEnh).

In various example embodiments, NE 210 may further indicate a sub-partitioning and/or prioritization within the configured combination of RA features. For example, when the RA feature combination includes two features (i.e., Redcap and SmallData), various sub-partitions may be indicated via an additional bitmap, such as RedCap UEs (such as UE 220) doing SDT, Redcap UEs doing non-SDT, non-RedCap UEs doing SDT, and non-Redcap UEs doing non-SDT.

According to some example embodiments, the other cause values may be bundled with slicing; since all services may be associated with at least one slice, prioritization of those services may not be necessary, such as follows:

```
FeatureCombination := SEQUENCE (SIZE (1.. maxNrofFeatures)) OF RA-feature
RA-feature := SEQUENCE {
   sliceGroup                        INTEGER (1..4),
   ra-Feature                          CHOICE {
   redCap,
   smallData,
   covEnh,
   reserved1 - for potential Rel-18+Feature
}
FeaturesCombinationIndicationBitmap := BIT STRING (SIZE (maxNrofFeatures))
maxNrofFeatures       :=       INTEGER (1..N) // e.g. N = 5
```

Additionally or alternatively, slicing may be considered explicitly in the RA partition, but may be restricted to be combined only with a subset of other features (e.g., CovEnh) by using, for example, "CHOICE" type of signalling, an ASN.1 encoding representing a list of options to select.

In the example above, the bit cost is 4*. Alternatively, the slices may be signalled separately from the feature combination set and/or with special conditions, but with the feature sets becoming associated with any slice resources, by signalling the slicingGroup outside the FeatureCombination. At 203, UE 220 may then transmit a random access response to NE 210.

Figure 3:
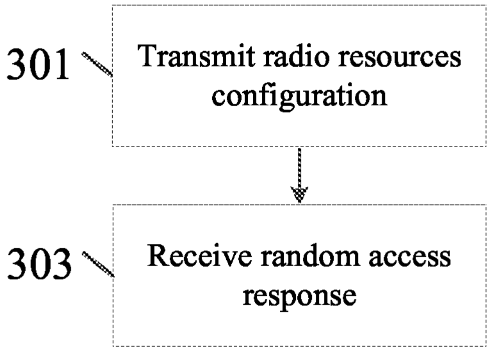
FIG. 3 illustrates an example of a flow diagram of a method according to various example embodiments.

FIG. 3 illustrates an example of a flow diagram of a method that may be performed by a NE, such as NE 520 illustrated in FIG. 5, according to various example embodiments. At 301, the method may include transmitting a radio resources configuration to a UE (which may be similar to UE 510 in FIG. 5), which may include signalling to indicate to the UE feature combinations and associated radio access resources split across the feature combinations applicable to a RACH configuration for the NE and the UE. Some example embodiments may use a fixed number of explicitly reserved bits for signaling, wherein each RA purpose may be indicated by 1 bit, and K bits may be reserved for later changes. For example, each RA partition may be determined under RACHCommon configuration based on at least one intended feature or feature combination sets. For example, two bitmaps may indicate the features or feature combination sets corresponding to the given RA partition. A first bitmap (i.e., denoted FeatureCombination) may indicate to the UE the applicable RA purposes/features (e.g., RedCap, Small Data, CovEnh, etc.) used by the given cell (max N bits, thus max N purposes/features), while a second bitmap (i.e., denoted FeatureCombinationIndicationBitmap) may indicate the actual combinations of RA features and prioritization (max M combinations, e.g., RedCap+Small Data combo) applicable for the UE out of features/purposes set in the first bitmap, such as follows:

```
FeatureCombination : := SEQUENCE {
   redCap          ENUMERATED {true}     OPTIONAL,
   smallData       ENUMERATED {true}     OPTIONAL,
   slicing         ENUMERATED {true}     OPTIONAL,
   covEnh          ENUMERATED {true}     OPTIONAL,
   spare1          ENUMERATED {true}     OPTIONAL,
   spare2          ENUMERATED {true}     OPTIONAL,
   spare3          ENUMERATED {true}     OPTIONAL,
   spare4          ENUMERATED {true}     OPTIONAL
}
FeaturesCombinationIndicationBitmap ::= BIT STRING (SIZE (maxNrofFeatures))
maxNrofFeatures    ::=     INTEGER (2..8)
```

The two example encodings may indicate 4 purposes (e.g., redCap, smallData, slicing, and CovEnh), while 4 bits may be reserved to retain enough flexibility. FeaturesCombinationIndicationBitmap may comprise a bit for each feature set to "true" in the FeatureCombination, allowing any combination out of those features to be signalled.

In another example, a bit string may be used for the spare values in the FeatureCombination (similar to MIB), such as below:

```
FeatureCombination : := SEQUENCE {
   redCap          ENUMERATED {true}   OPTIONAL,
   smallData       ENUMERATED {true}   OPTIONAL,
   slicing         ENUMERATED {true}   OPTIONAL,
   covEnh          ENUMERATED {true}   OPTIONAL,
   spare           BIT STRING (SIZE(4))
}
```

As a result, the bit-cost in SI would be 3+(2-8)=5-11 bits added to the RA feature combination. The NE may only need to indicate the bitmap of feature combinations, and the ASN.1 definition of the FeatureCombination indicates the remaining features.

Using the above embodiments, 3GPP Rel-17 may be configured as FeatureCombination (size 8): {RedCap: true; smallData: true; slicing: true; CovEnh: true; Reserved: false}, maxNrofFeatures=4 (4 features set to true). Alternatively, Feature CombinationIndicationBitmap (size 4) may be configured as:

| | RedCap | Small Data | Slicing | CovEnh |
|---|---|---|---|---|
| SDT + RedCap combo | 1 | 1 | 0 | 0 |
| Slicing + CovEnh + combo | 1 | 1 | 0 | 0 |

Using the above embodiments, 3GPP Rel-18 may configure the following: FeatureCombination (size 8): o {RedCap: true; smallData: true; slicing: true; CovEnh: true; Rel-18 Feature: true; Reserved: false}; maxNrofFeatures=5 (5 features set to true). Alternatively, FeatureCombinationIndicationBitmap (size 4) may be configured as:

| | RedCap | Small Data | Slicing | CovEnh | R18 Feature |
|---|---|---|---|---|---|
| SDT + RedCap combo | 1 | 1 | 0 | 0 | 0 |
| Slicing + CovEnh + combo | 1 | 1 | 0 | 0 | 0 |
| Slicing + CovEnh + R.18 | 1 | 1 | 0 | 0 | 1 |

In various example embodiments, slicing may be indicated implicitly or separately, and/or may be considered or partially in the RA partition. For example, each RA partition defined for the bitmaps in certain example embodiments may be used by the UE assigned to a specific slice group. Additionally or alternatively, slicing may be considered explicitly in the RA partition, but may be restricted to be combined only with a subset of other features (e.g., CovEnh) by using "CHOICE" type of signalling, an ASN.1 encoding representing a list of options to select.

As an example, a more dynamic list of features may be populated, as shown below, thus allow for almost infinite extendibility as any number of additional RA features could be added at the cost of additional signalling, such as follows:

```
FeatureCombination ::= SEQUENCE (SIZE (1.. maxNrofFeatures)) OF
RA-Feature
RA-Feature :: CHOICE {
   redCap,
   smallData,
   slicing,
   covEnh,
   reserved1, for potential Rel-18+Feature
   reserved2, for potential Rel-18+Feature
   reserved3, for potential Rel-18+Feature
   reserved4, for potential Rel-18+Feature
}
FeaturesCombinationIndicationBitmap ::= BIT STRING (SIZE
(maxNrofFeatures))
maxNrofFeatures ::=       INTEGER (1..N) // e.g. N = 5
```

In this way, the bit-cost in SI would be (1−N)*3+N=N+3-4N bits (e.g., 8-20 bits in case N=5, similarly as with previous example the size depending on how many feature combinations are indicated).

In certain example embodiments, slicing may be indicated in a feature combination, with overriding or partial applicability in the RA partition. Specifically, each RA partition (and associated feature combination) may correspond to (i.e., be assigned to) one slice group, with slice group=1 corresponding to a non-slicing case (i.e., default slice). For example, slice group 2 may correspond to feature combination 1 (e.g., SDT+RedCap), while slice group 3 may correspond to feature combination 2 (e.g., SDT+covEnh).

In various example embodiments, the NE may further indicate a sub-partitioning and/or prioritization within the configured combination of RA features. For example, when the RA feature combination includes two features (i.e., Redcap and SmallData), various sub-partitions may be indicated via an additional bitmap, such as Redcap UEs (such as the UE) doing SDT, Redcap UEs doing non-SDT, non-Redcap UEs doing SDT, and non-Redcap UEs doing non-SDT.

According to some example embodiments, all other cause values may be bundled with slicing; since all services may be associated with at least one slice, prioritization of those services may not be necessary, such as follows:

```
FeatureCombination := SEQUENCE (SIZE (1.. maxNrofFeatures)) OF RA-feature
RA-feature := SEQUENCE {
   sliceGroup                              INTEGER (1..4),
   ra-Feature                                CHOICE {
   redCap,
   smallData,
   covEnh,
   reserved1 - for potential Rel-18+Feature
}
FeaturesCombinationIndicationBitmap := BIT STRING (SIZE (maxNrofFeatures))
maxNrofFeatures        :=          INTEGER (1..N) // e.g. N = 5
```

In the example above, the bit cost is 4*. Alternatively, the slices may be signalled separately from the feature combination set and/or with special conditions, but with the feature sets becoming associated with slice resources, by signalling the slicingGroup outside the FeatureCombination. At 303, the method may further include receiving a random access response from the UE.

Figure 4:
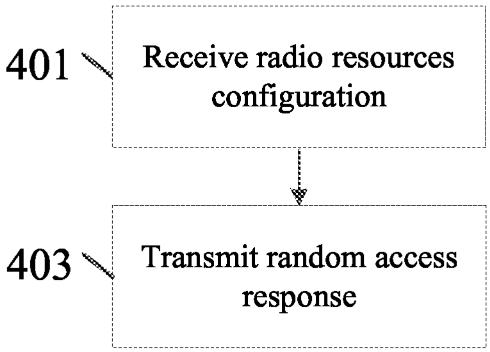
FIG. 4 illustrates an example of a flow diagram of a method according to various example embodiments.

FIG. 4 illustrates an example of a flow diagram of a method that may be performed by a UE, such as UE 520 illustrated in FIG. 5, according to various example embodiments. At 401, the method may include receiving a radio resources configuration from a NE (which may be similar to NE 510 in FIG. 5), which may include signalling to indicate to the UE feature combinations and associated radio access resources split across the feature combinations applicable to a RACH configuration for the NE and the UE. Some example embodiments may use a fixed number of explicitly reserved bits for signaling, wherein each RA purpose may be indicated by 1 bit, and K bits may be reserved for later changes. For example, each RA partition may be determined under RACHCommon configuration based on at least one intended feature or feature combination sets. For example, two bitmaps may indicate the features or feature combination sets corresponding to the given RA partition. A first bitmap (i.e., denoted FeatureCombination) may indicate to the UE the applicable RA purposes/features (e.g., RedCap, Small Data, CovEnh, etc.) used by the given cell (max N bits, thus max N purposes/features), while a second bitmap (i.e., denoted FeatureCombinationIndicationBitmap) may indicate the actual combinations of RA features and prioritization (max M combinations, e.g., RedCap+Small Data combo) applicable for the UE out of features/purposes set in the first bitmap, such as follows:

```
FeatureCombination := SEQUENCE {
   redCap          ENUMERATED {true}          OPTIONAL,
   smallData       ENUMERATED {true}          OPTIONAL,
   slicing         ENUMERATED {true}          OPTIONAL,
   covEnh          ENUMERATED {true}          OPTIONAL,
   spare1          ENUMERATED {true}          OPTIONAL,
   spare2          ENUMERATED {true}          OPTIONAL,
   spare3          ENUMERATED {true}          OPTIONAL,
   spare4          ENUMERATED {true}          OPTIONAL
}
```

-continued

```
FeaturesCombinationIndicationBitmap ::= BIT STRING (SIZE (maxNrofFeatures))
maxNrofFeatures    ::=    INTEGER (2..8)
```

The two example encodings may indicate 4 purposes (e.g., redCap, smallData, slicing, and CovEnh), while 4 bits may be reserved to retain enough flexibility. FeaturesCombinationIndicationBitmap may comprise a bit for each feature set to "true" in the FeatureCombination, allowing any combination out of those features to be signalled.

In another example, a bit string may be used for the spare values in the FeatureCombination (similar to MIB), such as below:

```
FeatureCombination : := SEQUENCE {
  redCap          ENUMERATED {true}    OPTIONAL,
  smallData       ENUMERATED {true}    OPTIONAL,
  slicing         ENUMERATED {true}    OPTIONAL,
  covEnh          ENUMERATED {true}    OPTIONAL,
  spare           BIT STRING (SIZE(4))
}
```

As a result, the bit-cost in SI would be 3+(2-8)=5-11 bits added to the RA feature combination. The NE may only need to indicate the bitmap of feature combinations, and the ASN.1 definition of the Feature Combination indicates the remaining features.

Using the above embodiments, 3GPP Rel-17 may be configured as FeatureCombination (size 8): {RedCap: true; smallData: true; slicing: true; CovEnh: true; Reserved: false}, maxNrofFeatures=4 (4 features set to true). Alternatively, Feature CombinationIndicationBitmap (size 4) may be configured as:

| | RedCap | Small Data | Slicing | CovEnh |
|---|---|---|---|---|
| SDT + RedCap combo | 1 | 1 | 0 | 0 |
| Slicing + CovEnh + combo | 1 | 1 | 0 | 0 |

Using the above embodiments, 3GPP Rel-18 may configure the following: FeatureCombination (size 8): o {RedCap: true; smallData: true; slicing: true; CovEnh: true; Rel-18 Feature: true; Reserved: false}; maxNrofFeatures=5 (5 features set to true). Alternatively, FeatureCombinationIndicationBitmap (size 4) may be configured as:

| | RedCap | Small Data | Slicing | CovEnh | R18 Feature |
|---|---|---|---|---|---|
| SDT + RedCap combo | 1 | 1 | 0 | 0 | 0 |
| Slicing + CovEnh + combo | 1 | 1 | 0 | 0 | 0 |
| Slicing + CovEnh + R.18 | 1 | 1 | 0 | 0 | 1 |

In various example embodiments, slicing may be indicated implicitly or separately, and/or may be considered or partially in the RA partition. For example, each RA partition defined for the bitmaps in certain example embodiments may be used by the UE assigned to a specific slice group. Additionally or alternatively, slicing may be considered explicitly in the RA partition, but may be restricted to be combined only with a subset of other features (e.g., CovEnh) by using "CHOICE" type of signalling, an ASN.1 encoding representing s list of options to select.

As an example, a more dynamic list of features may be populated, as shown below, thus allow for almost infinite extendibility as any number of additional RA features could be added at the cost of additional signalling, such as follows:

```
FeatureCombination ::= SEQUENCE (SIZE (1.. maxNrofFeatures)) OF
RA-Feature
RA-Feature :: CHOICE {
  redCap,
  smallData,
  slicing,
  covEnh,
  reserved1, for potential Rel-18+Feature
  reserved2, for potential Rel-18+Feature
  reserved3, for potential Rel-18+Feature
  reserved4, for potential Rel-18+Feature
}
FeaturesCombinationIndicationBitmap ::= BIT STRING (SIZE
(maxNrofFeatures))
maxNrofFeatures ::=      INTEGER (1..N) // e.g. N = 5
```

In this way, the bit-cost in SI would be (1−N)*3+N=N+3−4N bits (e.g., 8-20 bits in case N=5, similarly as with previous example the size depending on how many feature combinations are indicated).

In certain example embodiments, slicing may be indicated in a feature combination, with overriding or partial applicability in the RA partition. Specifically, each RA partition (and associated feature combination) may correspond to (i.e., be assigned to) one slice group, with slice group=1 corresponding to a non-slicing case (i.e., default slice). For example, slice group 2 may correspond to feature combination 1 (e.g., SDT+RedCap), while slice group 3 may correspond to feature combination 2 (e.g., SDT+covEnh).

In various example embodiments, the NE may further indicate a sub-partitioning and/or prioritization within the configured combination of RA features. For example, when the RA feature combination includes two features (i.e., Redcap and SmallData), various sub-partitions may be indicated via an additional bitmap, such as Redcap UEs (such as the UE) doing SDT, Redcap UEs doing non-SDT, non-Redcap UEs doing SDT, and non-Redcap UEs doing non-SDT.

According to some example embodiments, all other cause values may be bundled with slicing; since all services may be associated with at least one slice, prioritization of those services may not be necessary, such as follows:

```
FeatureCombination := SEQUENCE (SIZE (1.. maxNrofFeatures)) OF RA-feature
RA-feature := SEQUENCE {
  sliceGroupINTEGER (1..4),
  ra-FeatureCHOICE {
  redCap,
```

-continued

```
    smallData,
    covEnh,
    reserved1 - for potential Rel-18+Feature
}
FeaturesCombinationIndicationBitmap := BIT STRING (SIZE (maxNrofFeatures))
maxNrofFeatures ::=        INTEGER (1 ..N) // e.g. N = 5
```

In the example above, the bit cost is 4*. Alternatively, the slices may be signalled separately from the feature combination set and/or with special conditions, but with the feature sets becoming associated with slice resources, by signalling the slicingGroup outside the FeatureCombination. At 403, the method may further include transmitting a random access response to the NE.

FIG. 5 illustrates an example of a system according to certain example embodiments. In one example embodiment, a system may include multiple devices, such as, for example, UE 510 and/or NE 520.

UE 510 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

NE 520 may be one or more of a base station, such as an eNB or gNB, a serving gateway, a server, and/or any other access node or combination thereof. Furthermore, UE 510 and/or NE 520 may be one or more of a citizens broadband radio service device (CBSD).

NE 520 may further comprise at least one gNB-CU, which may be associated with at least one gNB-DU. The at least one gNB-CU and the at least one gNB-DU may be in communication via at least one F1 interface, at least one $X_n$-C interface, and/or at least one NG interface via a 5GC.

UE 510 and/or NE 520 may include at least one processor, respectively indicated as 511 and 521. Processors 511 and 521 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of the devices, as indicated at 512 and 522. The memory may be fixed or removable. The memory may include computer program instructions or computer code contained therein. Memories 512 and 522 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory, and which may be processed by the processors, may be any suitable form of computer program code, for example, a compiled or interpreted computer program written in any suitable programming language.

Processors 511 and 521, memories 512 and 522, and any subset thereof, may be configured to provide means corresponding to the various blocks of FIGS. 2-4. Although not shown, the devices may also include positioning hardware, such as GPS or micro electrical mechanical system (MEMS) hardware, which may be used to determine a location of the device. Other sensors are also permitted, and may be configured to determine location, elevation, velocity, orientation, and so forth, such as barometers, compasses, and the like.

As shown in FIG. 5, transceivers 513 and 523 may be provided, and one or more devices may also include at least one antenna, respectively illustrated as 514 and 524. The device may have many antennas, such as an array of antennas configured for multiple input multiple output (MIMO) communications, or multiple antennas for multiple RATs. Other configurations of these devices, for example, may be provided. Transceivers 513 and 523 may be a transmitter, a receiver, both a transmitter and a receiver, or a unit or device that may be configured both for transmission and reception.

The memory and the computer program instructions may be configured, with the processor for the particular device, to cause a hardware apparatus, such as UE, to perform any of the processes described above (i.e., FIGS. 2-4). Therefore, in certain example embodiments, a non-transitory computer-readable medium may be encoded with computer instructions that, when executed in hardware, perform a process such as one of the processes described herein. Alternatively, certain example embodiments may be performed entirely in hardware.

In certain example embodiments, an apparatus may include circuitry configured to perform any of the processes or functions illustrated in FIGS. 2-4. For example, circuitry may be hardware-only circuit implementations, such as analog and/or digital circuitry. In another example, circuitry may be a combination of hardware circuits and software, such as a combination of analog and/or digital hardware circuitry with software or firmware, and/or any portions of hardware processors with software (including digital signal processors), software, and at least one memory that work together to cause an apparatus to perform various processes or functions. In yet another example, circuitry may be hardware circuitry and or processors, such as a microprocessor or a portion of a microprocessor, that includes software, such as firmware, for operation. Software in circuitry may not be present when it is not needed for the operation of the hardware.

Figure 6:
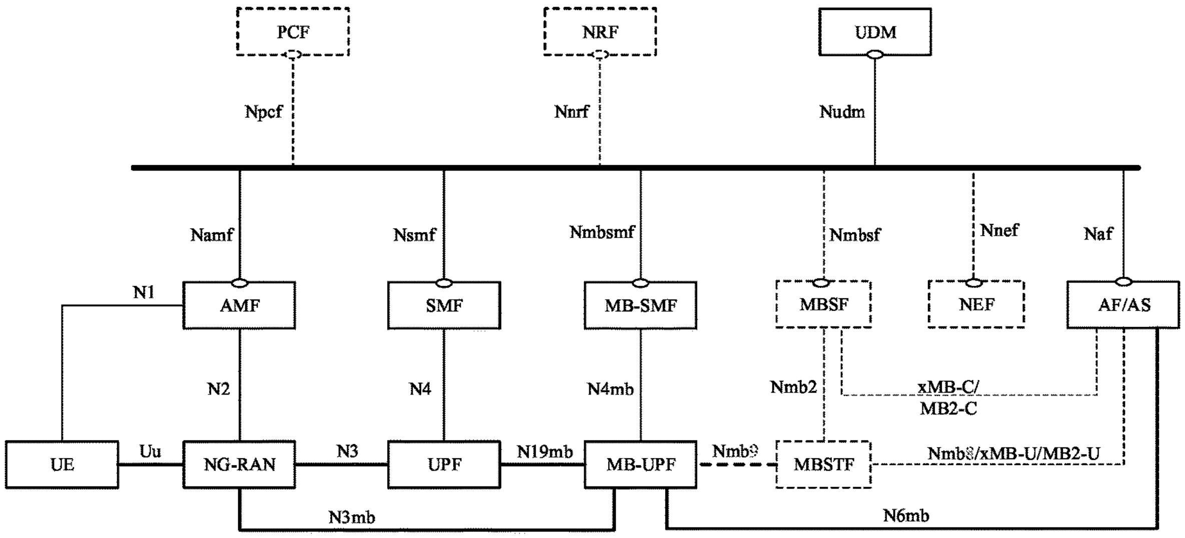
FIG. 6 illustrates an example of a 5G network and system architecture according to certain example embodiments.

FIG. 6 illustrates an example of a 5G network and system architecture according to certain example embodiments. Shown are multiple network functions that may be implemented as software operating as part of a network device or dedicated hardware, as a network device itself or dedicated hardware, or as a virtual function operating as a network device or dedicated hardware. The NE and UE illustrated in FIG. 6 may be similar to UE 510 and NE 520, respectively. The user plane function (UPF) may provide services such as intra-RAT and inter-RAT mobility, routing and forwarding of data packets, inspection of packets, user plane quality of service (QoS) processing, buffering of downlink packets, and/or triggering of downlink data notifications. The application function (AF) may primarily interface with the core network to facilitate application usage of traffic routing and interact with the policy framework.

According to certain example embodiments, processor 511 and memory 512 may be included in or may form a part of processing circuitry or control circuitry. In addition, in some example embodiments, transceiver 513 may be included in or may form a part of transceiving circuitry.

The features, structures, or characteristics of example embodiments described throughout this specification may be combined in any suitable manner in one or more example embodiments. For example, the usage of the phrases "various embodiments," "certain embodiments," "some embodiments," or other similar language throughout this specification refers to the fact that a particular feature, structure, or characteristic described in connection with an example embodiment may be included in at least one example embodiment. Thus, appearances of the phrases "in various embodiments," "in certain embodiments," "in some embodiments," or other similar language throughout this specification does not necessarily all refer to the same group of example embodiments, and the described features, structures, or characteristics may be combined in any suitable manner in one or more example embodiments.

Additionally, if desired, the different functions or procedures discussed above may be performed in a different order and/or concurrently with each other. Furthermore, if desired, one or more of the described functions or procedures may be optional or may be combined. As such, the description above should be considered as illustrative of the principles and teachings of certain example embodiments, and not in limitation thereof.

One having ordinary skill in the art will readily understand that the example embodiments discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of the example embodiments.

PARTIAL GLOSSARY

3GPP Third Generation Partnership Project
5G Fifth Generation
5GC Fifth Generation Core
5GS Fifth Generation System
ASIC Application Specific Integrated Circuit
ASN Abstract Syntax Notation
BS Base Station
CBRA Contention-Based Random Access
CBSD Citizens Broadband Radio Service Device
CFRA Contention-Free Random Access
CE Coverage Enhancement
CG Configured Grant
CN Core Network
C-RNTI Cell Radio Network Temporary Identifier
CovEnh Coverage Enhancement
CPU Central Processing Unit
eMBB Enhanced Mobile Broadband
eMTC Enhanced Machine Type Communication
eNB Evolved Node B
EPS Evolved Packet System
gNB Next Generation Node B
GPS Global Positioning System
HDD Hard Disk Drive
IE Information Element
KPI Key Performance Indicator
LTE Long-Term Evolution
LTE-A Long-Term Evolution Advanced
MAC Medium Access Control
MEMS Micro Electrical Mechanical System
MIB Master Information Block
MIMO Multiple Input Multiple Output
MME Mobility Management Entity
mMTC Massive Machine Type Communication
MTC Machine Type Communication
NAS Non-Access Stratum
NB-IoT Narrowband Internet of Things
NE Network Entity
NG Next Generation
NG-eNB Next Generation Evolved Node B
NG-RAN Next Generation Radio Access Network
NR New Radio
NR-U New Radio Unlicensed
PDA Personal Digital Assistance
PRACH Physical Random Access Channel
PUR Periodic Uplink Resources
RA Random Access
RACH Random Access Channel
RAM Random Access Memory
RAN Radio Access Network
RAT Radio Access Technology
RedCap Reduced Capability
RNTI Radio Network Temporary Identifier
RO Random Access Channel Occasion
RRC Radio Resource Control
SD Small Data
SDT Small Data Transmission
SI System Information
SIB System Information Block
SMF Session Management Function
SRB Signaling Radio Bearer
UE User Equipment
UMTS Universal Mobile Telecommunications System
UPF User Plane Function
URLLC Ultra-Reliable and Low-Latency Communication
UTRAN Universal Mobile Telecommunications System Terrestrial Radio Access Network
WLAN Wireless Local Area Network

We claim:

1. An apparatus, comprising:

at least one processor; and at least one memory including computer program code, wherein the at least one memory and the computer program code are configured to, with the at least one processor, cause the apparatus at least to:

transmit a radio resources configuration comprising at least one feature combination configuration associated with at least one random access resources configuration, wherein the at least one associated random access resources configuration is associated with access conditions for the at least one feature combination configuration, the at least one feature combination configuration is associated with at least one of coverage enhancement, network slicing, reduced capability user equipment, or small data transmission, and the radio resources configuration indicates at least:

a first radio access partition assigned to a first slice group identifier of a first network slice group comprising at least one first network slice, and a second radio access partition assigned to a second slice group identifier of a second network slice group comprising at least one second network slice.

2. The apparatus of claim 1, wherein the at least one feature combination configuration is transmitted with at least one bit string to indicate at least one feature combination applicability for using associated random access resources.

3. The apparatus of claim 1, wherein the at least one associated random access resources configuration comprises at least one radio access channel partition accessible at a certain time with a certain preamble.

4. The apparatus of claim 1, wherein the at least one feature combination configuration comprises at least one bit configured to indicate at least one feature combination association with associated random access resources.

5. The apparatus of claim 1, wherein the at least one feature combination configuration comprises at least one reserved bit.

6. The apparatus of claim 1, wherein the at least one feature combination configuration comprises at least a selection list configured to determine at least one feature combination associated with the at least one random access resources configuration.

7. The apparatus of claim 1, wherein the radio resources configuration comprises at least one radio access sub-partition associated with at least one of:

reduced capability user equipment configured to perform small data transmission;

reduced capability user equipment configured to perform non-small data transmission;

non-reduced capability user equipment configured to perform small data transmission; or non-reduced capability user equipment non-configured to perform small data transmission.

8. An apparatus, comprising:

at least one processor; and at least one memory including computer program code, wherein the at least one memory and the computer program code are configured to, with the at least one processor, cause the apparatus at least to:

receive a radio resources configuration comprising at least one feature combination configuration associated with at least one random access resources configuration, wherein the at least one associated random access resources configuration is associated with access conditions for the at least one feature combination configuration, the at least one feature combination configuration is associated with at least one of coverage enhancement, network slicing, reduced capability user equipment, or small data transmission, and the radio resources configuration indicates at least:

a first radio access partition assigned to a first slice group identifier of a first network slice group comprising at least one first network slice, and a second radio access partition assigned to a second slice group identifier of a second network slice group comprising at least one second network slice.

9. The apparatus of claim 8, wherein the at least one feature combination configuration is transmitted with at least one bit string to indicate at least one feature combination applicability for using associated random access resources.

10. The apparatus of claim 8, wherein the at least one associated random access resources configuration comprises at least one radio access channel partition accessible at a certain time with a certain preamble.

11. The apparatus of claim 8, wherein the at least one feature combination configuration comprises at least one bit configured to indicate at least one feature combination association with the associated random access resources.

12. The apparatus of claim 8, wherein the at least one feature combination configuration comprises at least one reserved bit.

13. The apparatus of claim 8, wherein the at least one feature combination configuration comprises at least a selection list configured to determine at least one feature combination associated with the at least one random access resources configuration.

14. The apparatus of claim 8, wherein the radio resources configuration comprises at least one radio access sub-partition associated with at least one of:

reduced capability user equipment configured to perform small data transmission;

reduced capability user equipment configured to perform non-small data transmission;

non-reduced capability user equipment configured to perform small data transmission; or non-reduced capability user equipment non-configured to perform small data transmission.

15. A non-transitory computer-readable medium comprising program instructions in which a computer program is stored that, when executed by a computer, is configured to provide instructions to cause an apparatus at least to:

receive a radio resources configuration comprising at least one feature combination configuration associated with at least one random access resources configuration, wherein the at least one associated random access resources configuration is associated with access conditions for the at least one feature combination configuration, the at least one feature combination configuration is associated with at least one of coverage enhancement, network slicing, reduced capability user equipment, or small data transmission, and the radio resources configuration indicates at least:

a first radio access partition assigned to a first slice group identifier of a first network slice group comprising at least one first network slice, and a second radio access partition assigned to a second slice group identifier of a second network slice group comprising at least one second network slice.

16. The computer-readable medium of claim 15, wherein the at least one feature combination configuration is transmitted with at least one bit string to indicate at least one feature combination applicability for using associated random access resources.

* * * * *